US005514863A

United States Patent [19]

Williams

[11] Patent Number: 5,514,863

[45] **Date of Patent: *May 7, 1996**

[54] RETURN MAIL PIECE AND METHOD OF MARKING THE SAME

[75] Inventor: Robert L. Williams, Omaha, Nebr.

[73] Assignee: Board of Regents - Univ. of Nebraska, Lincoln, Nebr.

[ * ] Notice: The term of this patent shall not extend beyond the expiration date of Pat. No. 5,324,927.

[21] Appl. No.: 258,699

[22] Filed: Jun. 13, 1994

Related U.S. Application Data

[63] Continuation of Ser. No. 2,195, Jan. 8, 1993, Pat. No. 5,324,927.

[51] Int. Cl.[6] .................... G06K 19/04

[52] U.S. Cl. .................... 235/494; 229/68.1; 209/584; 283/116

[58] Field of Search .................... 235/487, 494; 209/584; 229/68.1, 301; 283/116

[56] References Cited

U.S. PATENT DOCUMENTS

| | | | |
|---|---|---|---|
| 2,775,405 | 12/1956 | Paston | 229/68 R |
| 2,890,825 | 6/1959 | Patrick | 229/68 |
| 3,614,396 | 10/1971 | Goldstern | 229/68 R |
| 3,933,094 | 1/1976 | Murphy et al. | 101/426 |
| 4,117,975 | 10/1978 | Gunn | 235/494 |
| 4,317,030 | 2/1982 | Berghell | 235/489 |
| 4,445,635 | 5/1984 | Barr | 229/73 |
| 4,601,396 | 7/1986 | Pavie | 209/569 |
| 4,602,736 | 7/1986 | Barr | 229/73 |
| 4,688,715 | 8/1987 | Barr | 229/73 |
| 4,743,747 | 5/1988 | Fougere et al. | 235/494 |
| 4,796,196 | 1/1989 | Durst, Jr. et al. | 364/478 |
| 4,800,504 | 1/1989 | Durst, Jr. et al. | 364/478 |
| 5,324,927 | 6/1994 | Williams | 235/494 |

FOREIGN PATENT DOCUMENTS

| | | | |
|---|---|---|---|
| 1463663 | 12/1966 | France | 283/116 |

*Primary Examiner*—John Shepperd
*Attorney, Agent, or Firm*—Zarley, McKee, Thomte, Voorhees & Sease; Mark D. Frederiksen

[57] ABSTRACT

A return mail piece includes a generally rectangular sheet of material with a delimited mailing address zone, a bar code zone in the lower right corner of the sheet, and a subclassification zone in the upper left hand corner of the sheet. Site location indicia is printed within the mailing address zone to identify the address of the site location. Separate subclassification indicia is printed within the subclassification zone so as to identify one of a plurality of end locations as the site location.

8 Claims, 1 Drawing Sheet

RETURN MAIL PIECE AND METHOD OF MARKING THE SAME

CROSS-REFERENCE TO RELATED APPLICATION

This is a continuation application of Ser. No. 8/002,195 now U.S. Pat. No. 5,324,927 filed Jan. 8, 1993 entitled "Return Mail Piece and Method of Making the Same".

TECHNICAL FIELD

The present invention relates generally to mail pieces which are returned to a sender, and more particularly to a return mail piece which is specially marked by the sender to enable the sender to precisely classify or sort the return mail piece, and a method of accomplishing the marking of the mail piece.

BACKGROUND OF THE INVENTION

It is not uncommon for large businesses to supply preaddressed return envelopes to various consumers or clientele. The distribution of such return mail pieces is accomplished in many ways. For instance, a tear-out return card affixed in a magazine is one type of return mail piece. Return envelopes are commonly provided by large businesses in association with billing statements to various clients. Numerous other types of return mail pieces are utilized in various businesses.

Automatic processing machinery currently utilized by the postal service have optical character readers (OCR) which can read certain address indicia printed in a preselected mailing address zone located on the front on an envelope. The OCR reads the printed mailing address in the mailing address zone, and prints a bar code representing the zip code in a bar code zone on the front of the envelope below the mailing address zone. The bar code zone extends along the lower right edge of the envelope at a predetermined height and width.

Bar code readers are utilized in the automatic processing of mail to quickly sort the mail in accordance with destination information in the automated process apparatus.

Many large businesses are able to preprint their return mail pieces, and preprint the destination bar code within the bar code zone on the return mail piece so that the postal service merely utilizes its computer controlled automated processing equipment to read the bar codes and sort the mail pieces. The mail pieces are then delivered by the postal service to the addressee listed in the mailing address zone.

While the mailing address and zip code provided on a given envelope are adequate to deliver a return mail piece to a general destination, the zip code cannot provide enough information to enable the business mailer to further sort and classify the mail as may be desired. Similarly, the mailing address zone is typically not large enough to enable the business mailer to specifically identify the various end locations to which the return mail piece is to be directed.

In addition, it may be desirable to further sort return mail pieces within a particular department to which the envelope is addressed, for demographic survey purposes, or other various reasons. Again, the mailing address zone of the envelope does not provide the necessary space required for further coding information.

SUMMARY OF THE INVENTION

It is therefore an object of the present invention to provide a return mail piece which has additional identification markings printed thereon in areas other than the mailing address zone.

Another object of the present invention is to provide a return mail piece with additional identification codings for the addressee, which may be read by conventional existing automated processing equipment.

Still another object is to provide a method for marking a return mail piece in a specified location on the envelope with additional identification coding to enable the addressee to further sort and classify the return mail piece upon receipt.

These and other objects will be apparent to those skilled in the art.

The return mail piece of the present invention includes a generally rectangular sheet of material with a delimited mailing address zone, a bar code zone in the lower right corner of the sheet, and a subclassification zone in the upper left hand corner of the sheet. Site location indicia is printed within the mailing address zone to identify the address of the site location. Separate subclassification indicia is printed within the subclassification zone so as to identify one of a plurality of end locations as the site location.

DESCRIPTION OF THE PREFERRED EMBODIMENT

Figure 1:
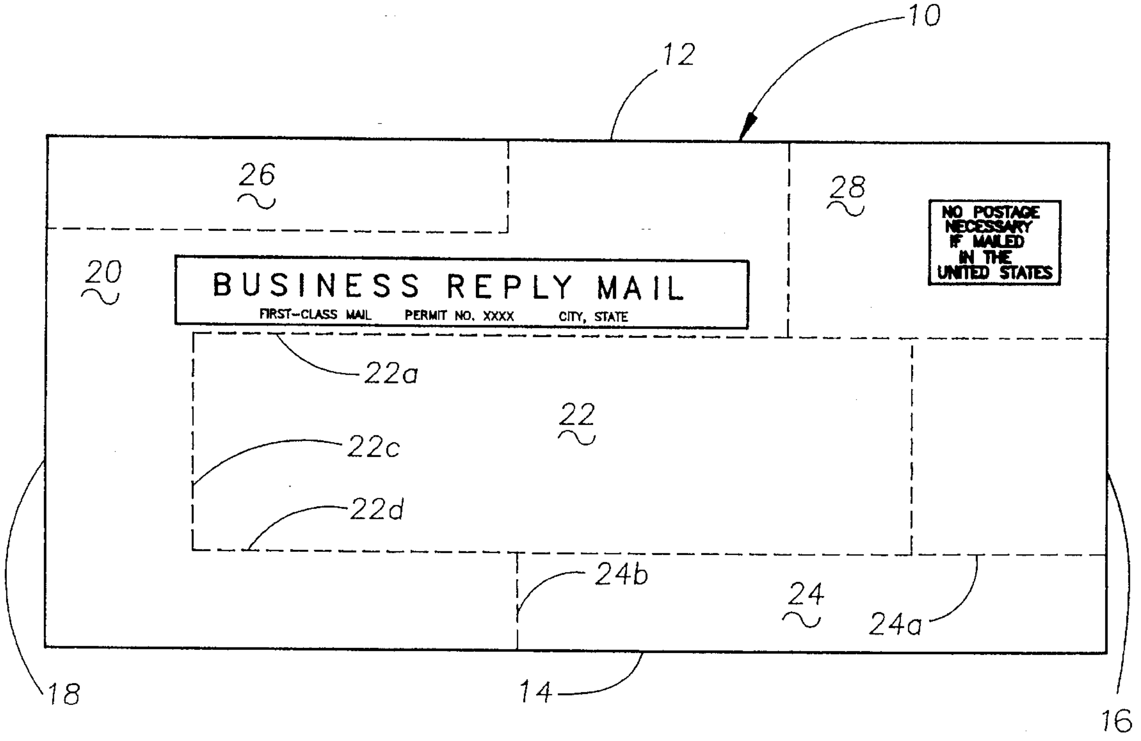
FIG. 1 is a front view of a return mail piece with various zones located thereon.

Referring now the drawings, in which similar or corresponding parts are identified with the same reference numeral, and more particularly to FIG. 1, a mail piece is identified generally at 10 and includes an upper edge 12, a lower edge 14 a right end edge 16 a left end edge 18 and a front face 20.

A mailing address zone 22 is enclosed by dashed lines in FIG. 1, and is utilized by automatic mail processing equipment to delimit the boundaries for optical character readers in reading mailing address indicia. The mailing address zone is defined by the postal service as having an upper limit **22*a* spaced about two and one quarter inches above the lower edge 14 of the mail piece, and edges 22*b* and 22*c* spaced inwardly one inch from the end edges 16 and 18 respectively, and a lower limit 22*d* spaced about five-eighths of an inch above the lower edge 14 of the envelope. A bar code zone 24 is delimited on mail piece 10 and is located with an upper limit 24*a* spaced five-eighths of an inch from the lower edge 14 of the mail piece, and a left limit 24*b* spaced about four and a half inches from the right edge of the envelope, such that the bar code zone 24 is located in the lower right corner of mail piece 10**.

A return address zone 26 is located in the upper left portion of the envelope, above the mailing address zone 22, while a postage zone 28 is located in the upper right corner of the envelope 10.

Figure 2:
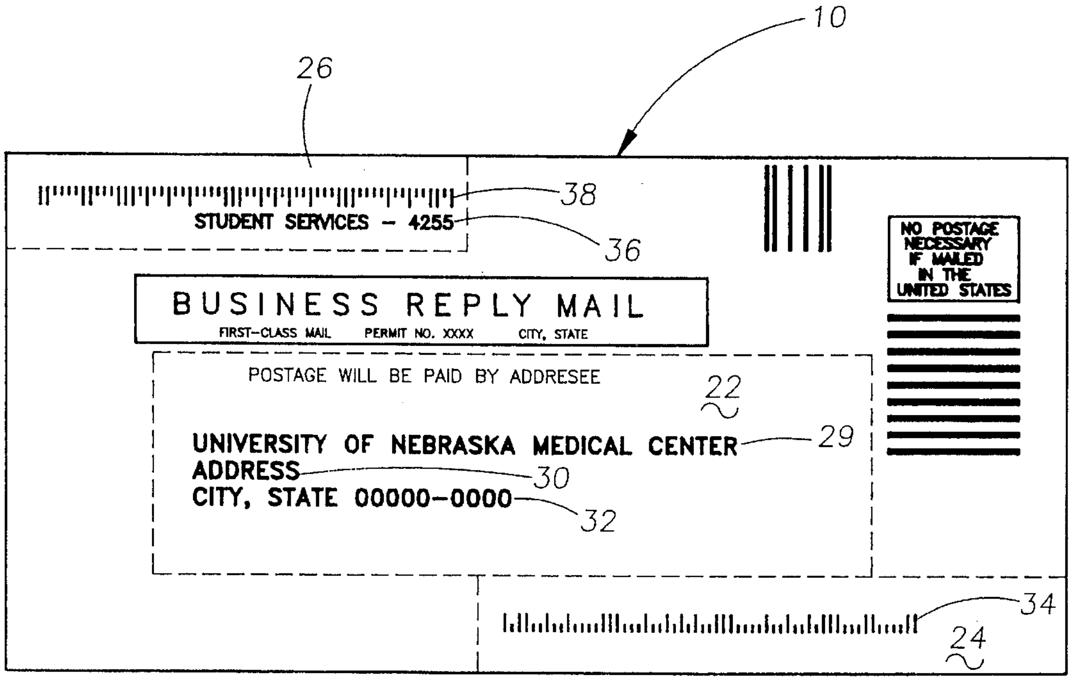
FIG. 2 is a view similar to FIG. 1, with printed indicia and identification coding located in the various zone/of the envelope according to the present invention.

Referring now to FIG. 2, envelope 10 has been printed under the method of this invention to provide additional location information to the recipient of the return mail piece, as described in more detail hereinbelow. Mailing address zone 22 has been imprinted with the business name 29, address 30 and zip code 32, in a conventional fashion. In addition, a bar code 34 is imprinted in bar code zone 24, to enable bar code readers of automatic mail processing equipment to automatically sort the envelope 10. Return mail envelopes such as that shown in FIG. 2, are commonly used by companies which mail out invoices, statements, advertising or the like during an initial mailing, and which provide the return mail piece 10 as part of the mailing, to be returned either to the original mailing address or to some other designated name or address. Thus, the original sender of the initial mailing prints the return mail piece 1 0, and desires to receive mail piece 10 by return mail.

In the case of large businesses, the space delimited as the mailing address zone 22 does not provide some of the desired highly specialized location information necessary to subclassify the return mail piece 10 and automatically direct it to an appropriate location. Thus, while envelope 10 will arrive at the general address listed in mailing address zone 22, according to the zip code 32 and bar code 34, many large businesses must then manually sort the mail to direct the return mail to appropriate departments, or for demographic survey purposes or the like.

The present inventor provides additional classifying information in the return address zone 26 of envelope 10, as shown in FIG. 2. Information may be provided in the form of printed characters 36, utilizing letters and/or numerals. However, conventional characters 36 are not located so as to be machine readable utilizing conventional automatic processing equipment. For this reason, the preferred embodiment of the invention utilizes an inverted bar code 38 which is oriented upside down with respect to the orientation of the mailing address zone 22 and bar code zone 24, although any orientation other than upright may be used. Thus, for purposes of automating, the return address zone 26 is preferably delimited using the same bar code zone 24 delimitations but in the opposite corner of the envelope. In this way, all of the return mail pieces 10 may be simply inverted and run through a conventional bar code reader of an automatic mail processing apparatus to further sort or classify the return mail pieces.

It can therefore be seen that mailing address zone 22 and bar code zone 24 provide general site location information, for the general location of the large business described in mail address zone 22. Return address zone 26 is provided with more specific identifying information which subclassifies the mail piece 10 after reaching the site location described in the mail address zone 22. In order to automate the sorting and classification of the return mail piece 10 at the site location described in mailing address zone 22, conventional printed indicia in the form of bar code 38 is imprinted in an inverted orientation within a special zone designated in the upper left hand corner of the mail piece 10 opposite of bar code zone 24.

Under the method of the present invention, the company which will be printing the return mail piece 10 will locate the desired return mail address within an address zone 22, a return mail bar code 34 within bar code zone 24, matching the zip code listed in line 32 of address zone 22. A separate return address zone 26 is delineated in the upper left hand corner of mail piece 10, opposite bar code zone 24. The appropriate subclassification information is printed in return address zone 26, to further classify the department or section to which the return mail piece 10 is to be sorted once reaching the site location listed in address zone 22. In the preferred embodiment of the invention, the information listed in return address zone 26 is printed in the form of bar code inverted in an upside down orientation such that the bar code can be read by a conventional bar code reader of automatic processing equipment, when the envelope is inserted in the bar code reader upside down.

Whereas the invention has been shown and described in connection with the preferred embodiments thereof, it will be understood that many modifications, substitutions and additions may be made which are within the intended broad scope of the appended claims. There has therefore been shown and described an improved mail piece and method for marking the same which accomplishes at least all of the above stated objects.

I claim:

1. A return mail piece for a site location having a plurality of end locations, comprising:

a mail piece having a front surface and a rearward surface;

said front surface having a predetermined address zone with site location indicia printed therein in an upright orientation, identifying the address of the site location; and said mail piece having a predetermined subclassification zone thereon, separate from said address zone, with subclassification indicia printed therein in an orientation other than upright relative to said site location indicia.

2. The mail piece of claim 1, wherein said subclassification indicia is machine readable code.

3. The mail piece of claim 2, wherein said subclassification indicia is bar code.

4. A return mail piece for a site location having a plurality of end locations, comprising:

a generally rectangular sheet of material having a front surface and rear surface;

said front surface having a predetermined address zone with site location indicia printed therein in an upright orientation, identifying the address of the site location; and said mail piece having a predetermined subclassification zone thereon, separate from said address zone, with subclassification indicia printed therein in an orientation other than upright relative to said site location indicia.

5. The mail piece of claim 2, wherein said subclassification indicia is machine readable code.

6. The mail piece of claim 5, wherein said subclassification indicia is bar code.

7. A method for sorting return mail pieces received at a site location into categories based upon subclassification criteria, comprising the steps of:

printing site location indicia in an upright orientation in a predetermined mailing address zone on a front surface of a mail piece;

printing subclassification indicia in a predetermined subclassification zone on said mail piece, the subclassification zone located separate from the mailing address zone, and the subclassification indicia printed in an orientation other than upright with respect to the site location indicia;

mailing the return mail piece to a predetermined entity;

receiving the mail piece at the site location indicated by the site location indicia;

manipulating the mail piece to orient the subclassification indicia in an upright position;

reading the subclassification indicia from the mail piece; and sorting the mail piece according to the subclassification indicia read in the reading step.

8. A method for sorting return mail pieces received at a site location into categories based upon subclassification criteria, comprising the steps of:

printing site location indicia in an upright orientation in a predetermined mailing address zone on a front surface of a generally rectangular sheet of material forming a mail piece;

printing subclassification indicia in a predetermined subclassification zone on said mail piece, the subclassification zone located separate from the mailing address zone, and the subclassification indicia printed in an orientation other than upright with respect to the site location indicia;

mailing the return mail piece to a predetermined entity;

receiving the mail piece at the site location indicated by the site location indicia;

manipulating the mail piece to orient the subclassification indicia in an upright position;

reading the subclassification indicia from the mail piece; and sorting the mail piece according to the subclassification indicia read in the reading step.

* * * * *